Patented Aug. 3, 1948

2,446,429

UNITED STATES PATENT OFFICE 2,446,429

CELLULAR PHENOLIC RESIN

John D. Nelson and Paul V. Steenstrup, Pittsfield, Mass., assignors to General Electric Company, a corporation of New York No Drawing. Application October 20, 1944, Serial No. 559,661

16 Claims. (Cl. 260—59)

This invention relates to new and useful products comprising a cellular phenolic resin, more particularly a cellular phenol-aldehyde resin, and to methods of making the same.

It was known prior to our invention that cellular products could be prepared from rubber and other natural and synthetic materials. For example, it has been suggested that cellular materials be produced by converting a solution of a hardenable urea-aldehyde or thiourea-aldehyde condensation product into a foam-like mass by vigorous stirring or beating while adding a foam-forming substance of an acid nature, more particularly an alkylated naphthalene sulfonic acid, which also functions to accelerate the hardening of the condensation product in expanded state. Such cellular materials have a low density but their field of utility definitely is limited by reason of their relatively low compressive strength. Furthermore, they are costly to manufacture due, for one reason, to the difficulty in drying the expanded material, since all of the water or other solvent in the solution of the condensation product is still present and must be removed from the hardened cellular mass without collapsing the cellular structure. Also, since a vigorous stirring action is required in making such cellular products, they cannot be produced readily, if at all, in situ, that is, in the place where they are to be used.

Another earlier suggestion has been to mold a resinous composition containing a substance that afterward might be eliminated from the molded article so as to leave connecting pores or capillaries therein. Examples of such suggested methods are those involving molding a wood flour-filled phenol-formaldehyde composition containing crystalline sodium carbonate and subsequent treatment of the molded article with a dilute mineral acid to remove the sodium carbonate; molding an asbestos-filled phenoplast containing a large amount of naphthalene and thereafter removing the naphthalene by sublimation; and molding a phenol-formaldehyde composition containing potassium chloride and subsequently dissolving out the potassium chloride with water. Such methods are costly to practice and, to the best of our knowledge and belief, have not gone into commercial use.

It is an object of our invention to provide products comprising a cellular phenolic resin, more particularly a cellular phenol-aldehyde resin, and to manufacture such products by a method which is simple, practical and relatively inexpensive.

Another object of our invention is to provide a method of converting a liquid phenolic resin to cellular or expanded state in situ.

Another object of our invention is to provide new and useful materials having excellent thermal insulating properties.

Other and further object of this invention will be apparent to those skilled in the art as a reading of this specification proceeds.

The foregoing objects, as well as others, are attained by preparing a foam-forming, heat-generating, acidified composition, which is flowable or pourable under normal temperature and pressure conditions, and which contains (1) an aqueous (water-containing) mass of acid-curing, thermosetting, liquid phenolic resin, e. g., an aqueous mass of acid-curing, thermosetting, liquid product of partial reaction of ingredients comprising "a phenol," within the meaning of which term is included, for instance, phenol ($C_6H_5OH$) itself, m-cresol, 3,5-xylenol, resorcinol, etc., as well as mixtures of phenols, and an aldehyde, e. g., formaldehyde, furfural, etc., as well as mixtures of aldehydes, (2) a water-soluble, gasifiable substance that will liberate a gas when brought into contact with a water-soluble sulfonic acid, more particularly a water-soluble salt of carbonic acid, e. g., a bicarbonate of an alkali metal, and (3) a water-soluble sulfonic acid, more particularly a water-soluble sulfonic acid wherein the sulfonic acid grouping is attached directly to an aromatic nucleus, e. g., the aromatic nucleus of a hydroxy aromatic compound. The foam-forming, heat-generating composition is allowed to expand and to react to completion in expanded state to produce the new cellular products of our invention. Ultimate reaction products of maximum expansion (lowest density) are obtained when the foam-forming composition includes, in addition to the aforementioned ingredients of (1), (2) and (3), a water-soluble, surface-active agent, e. g., a polyethylene ether of sorbitan mono ester of a long chain fatty acid, for instance, polyethylene ethers of sorbitan mono-laurate, polyethylene ethers of sorbitan mono-stearate, polyethylene ethers of sorbitan mono-oleate, etc.

The above-described foam-forming, heat-generating composition is self-rising and self-curing. Generally within about 1 to 5 minutes after the ingredients have been mixed, the mixture begins to foam. In test batches using about 225 grams of liquid resin, the temperature attained during the expansion of the resin was found to be within the range of about 96° to about 102° C. The foam sets to a rigid, cellular mass as it expands, the hardening of the resin usually being accompanied by a change in color. The heat generated during the reaction and the slightly acid character of the resin foam during its expansion are sufficient to complete the reaction and to convert the acid-curing, thermosetting phenolic resin to a cured or insoluble and infusible state without an additional drying step or applied heat. The cellular mass may be used, if desired, as soon as the foam reaches its maximum expansion. Or, it may be aged for a short or a long period at a suitable temperature, e. g., at room temperature, prior to use. The expanded product in some cases is 30 times the volume of the original liquid resin. Containers having a capacity as much as 50 cubic feet have been completely filled with the rigid foam, simply by pouring the liquid resinous mass into the container and allowing the liquid resin to expand.

Besides their ability to be formed in situ, the cellular phenolic resins of this invention have excellent thermal insulating properties. In the following table are shown the density in pounds per cubic foot and thermal conductivity (British thermal units per hour per sq. ft. of area per inch of thickness per °F. difference between the two faces) of two different grades of the cellular phenolic resin of this invention and of other common insulating materials:

Table

|  | Density in lbs./cu. ft. | "K" |
|---|---|---|
| Cellular phenolic resin of this invention, No. 1 | 1.7 | 0.24 |
| Kapok | 1.0 | 0.24 |
| Glass wool | 4.0 | 0.26 |
| Hair felt | 9.0 | 0.26 |
| Rock wool | 6.0 | 0.27 |
| Cellular phenolic resin of this invention, No. 2 | 7.9 | 0.28 |
| Cork board | 7.0 | 0.28 |
| Fibre board | 18.0 | 0.34 |

Our new cellular phenolic resins will not support combustion and are unaffected by most solvents. Although the expanded resin is not affected by immersion in water, the cellular nature of the rigid foam will permit the penetration of some moisture unless suitable barriers are utilized. However, a sample placed in salt water without any protective coating was still very buoyant at the end of 4 months and was unaffected dimensionally. The cellular resin will withstand temperatures as high as 200° C. It can be cut easily with a knife or saw.

The cellular phenolic resins of this invention can be produced in varying densities, as desired or as may be required in order to meet a particular service application. For example, their densities may vary from about ½ pound to about 17 pounds per cubic foot. The expanded product is characterized by having both open (connected) and closed (disconnected) cells or pores. However, as the above statements show, the number of connected cells is not so great as to seriously affect the buoyancy or heat-insulating qualities of the product. Since the reaction is controlled, as by suitably proportioning the ingredients, e. g., the proportion of water-soluble sulfonic acid to the water-soluble gasifiable substance and to the liquid resin, etc., by initiating the reaction in the absence of applied heat, by suitable cooling when the ambient temperature is too high, etc., a fairly uniform cell or pore size exists throughout the expanded mass.

As originally obtained, the rigid foams in all cases have a tough skin formed on all outer surfaces. This outer skin, which has a higher density than the inner portion of the cellular mass, acts as a stiffener and protector for the mass. For some applications it is desirable to leave this outer portion or skin on the cellular product, while for other applications where a product of lower density is required the skin is trimmed off. If there is any other substantial variation in the size of the cells or pores or in the uniformity of the cellular product, it generally will exist in the upper part of the expanded mass, where cells of larger size than may be found elsewhere throughout the mass sometimes appear immediately beneath the above-described tough outer skin. If desired, the portion containing such larger pores or cells may be trimmed off the piece along with the tough outer skin so as to obtain a cellular product having what appears to the naked eye to be a material with substantially uniform cell or pore structure. It is even possibe to trim away the upper portion when the material is formed in situ, since it is usually desirable that the cellular mass expand beyond the upper opening of the container to insure complete filling of the same.

In order that those skilled in the art better may understand how the present invention may be carried into effect, the following examples are given by way of illustration and not by way of limitation. All parts and percentages are by weight.

EXAMPLE 1

A. *Preparation of liquid resin*

Approximate
Mol Ratio

"82% phenol" [1] _____ 1
Aqueous solution of formaldehyde (approx. 37.2% HCHO) _____ 1.3
Small amount of an alkaline catalyst, specifically barium hydroxide.[2]

[1] "82% phenol" is composed of 82 to 84% phenol ($C_6H_5OH$), 3 to 4% o-cresol, and the remainder mainly m- and p-cresols.
[2] The amount of alkaline catalyst may be, for example, between 0.5 and 2% by weight of the phenol. Thus, with barium hydroxide, $Ba(OH)_2 \cdot 8H_2O$, as the catalyst a suitable amount is, for instance, from 1 to 1.5%, more particularly about 1.2% by weight of the phenol.

The above ingredients are heated together under reflux at the boiling temperature of the mass for a period of the order of ¾ to 1 hour. Thereafter the reaction mass is treated to render it non-alkaline, that is, neutral or slightly acid, preferably after cooling to a suitable temperature, e. g., 50 or 60° C. The mass may be brought to a pH of, say, 5 to 7 (but preferably is brought to a pH of 6.5 or less) by the addition of a suitable acid or acid-forming substance, e. g., formic acid, acetic acid, oxalic acid, carbon dioxide, hydrochloric acid, sulfuric acid, phosphoric acid, etc. If the resulting salt of the alkaline catalyst that forms is insoluble or substantially insoluble in the liquid mass it may be separated, if desired, from the liquid partial reaction product, e. g., by filtration. The liquid, non-alkaline mass is partially dehydrated under reduced pressure. Dehydration is continued until the liquid resin has a viscosity of approximately 18,000 to 25,000 centipoises at 25° C., at which point the mass has a specific gravity of about 1.22 to about 1.24 at 25° C. and contains at least about 75%, more particularly about 78 to about 85%, of resin solids as determined by curing a sample to constant weight in a tared container. The aqueous mass of acid-curing, thermosetting, alkaline-catalyzed, more particularly barium hydroxide-catalyzed, liquid product of partial reaction of ingredients including phenol and formaldehyde, prepared as above described, is referred to in the following formula and in other examples as "resin A."

B. *Preparation of cellular product*

|  | Parts |
|---|---|
| Resin A | 50.0 |
| Approximately 30% aqueous solution of a technical grade of phenol sulfonic acid | 2.5 |
| Sodium bicarbonate | 0.35 | are intimately mixed at room temperature (20° to 30° C.). A reaction between the phenol sulfonic acid and sodium bicarbonate takes place, with the result that gaseous carbon dioxide is evolved, while some of the acid functions as a catalyst to accelerate the conversion of the resin to a cured or insoluble and infusible state. The mass becomes hot and froths, the foaming of the resin being aided both by the evolved carbon dioxide gas and by the water vapor resulting from the heat of the reaction. The final product is a cured, cellular, resinous mass of low density having both open and closed cells or pores. It may be employed without drying or baking prior to use, for example, as a thermal or a sound insulating material.

EXAMPLE 2

|  | Parts |
|---|---|
| Resin A | 30.0 |
| Approximately 30% aqueous solution of a technical grade of phenol sulfonic acid | 3.0 |
| Sodium bicarbonate | 0.21 |
| Surface-active material, specifically Tween 20 [1] | 0.06 |

[1] Tween 20 is produced and sold by Atlas Powder Company, Wilmington, Delaware, and is a commercial grade of polyethylene ethers of sorbitan mono-laurate.

The acid solution and Tween 20 were mixed thoroughly with the liquid resin, which initially was at room temperature, in an open-mouthed, inverted cone-shaped, paper container, after which the sodium bicarbonate was added. After further mixing for 15 to 30 seconds and allowing to stand for a short period, say about 1 to 5 minutes, the mass generated heat, foamed and set to a cellular product having a density much less than that of the product obtained from a foam-forming composition free from the surface-active material (Tween 20) but which otherwise is the same. The volume of product usually is more than doubled when Tween 20 or similar surface-active material is a component of the formula as compared with that obtained when it is omitted. Furthermore, the surface-active material improves the texture of the expanded resin and minimizes the formation of large air pockets therein.

Cellular products similarly are produced when the aqueous solution of phenol sulfonic acid in the above formula is replaced by, for example, an aqueous solution of (a) p-Toluene sulfonic acid,
(b) Benzene sulfonic acid,
(c) β-naphthalene sulfonic acid,
(d) Camphor sulfonic acid,
(e) Benzene m-disulfonic acid, and
(f) Butyl sulfonic acid.

We have found that the effectiveness of p-toluene sulfonic acid is about the same as that of phenol sulfonic acid, while naphthalene sulfonic acid is only slightly less effective. The benzene m-disulfonic acid is very reactive and produces an expanded resin, when used in conjunction with the water-soluble gasifiable substance, having a fairly good texture. The acid solution need not be aqueous. For example, an alcoholic solution of p-toluene sulfonic acid has been used successfully.

The sodium bicarbonate of the above formula may be replaced by an amount of other water-soluble substance or substances that will evolve an equivalent amount of gas, at normal temperature or under the influence of heat, while in contact with a water-soluble sulfonic acid, e. g., a bicarbonate of an alkali metal other than sodium (e. g., potassium bicarbonate, lithium bicarbonate, etc.), a carbonate of an alkali metal (e. g., sodium carbonate, potassium carbonate, lithium carbonate, etc.), ammonium carbonate, ammonium bicarbonate, sodium nitrite, potassium nitrite, etc. With some water-soluble, gasifiable compounds, specifically ammonium carbonate and sodium nitrite, a large expansion of the liquid resin is obtained, but the reaction proceeds so rapidly that the texture of the cellular product is not quite so satisfactory as when sodium bicarbonate is employed. Potassium carbonate gives better results than sodium carbonate, but neither equals the effectiveness of sodium bicarbonate (all other influencing factors being the same) form the standpoint of texture and volume of expansion.

EXAMPLE 3

|  | Parts |
|---|---|
| Resin A | 2280.0 |
| Approximately 30% aqueous solution of a technical grade of phenol sulfonic acid | 143.0 |
| Sodium bicarbonate | 15.4 |
| Walnut shell flour | 7.7 |

The aqueous solution of phenol sulfonic acid and liquid resin were mixed thoroughly at room temperature, after which the sodium bicarbonate and walnut shell flour were added, using an electric stirrer to facilitate the mixing. The mix was poured into a shallow container (22 in. x 22 in. area) covered with Cellophane on the bottom. In about 2 to 3 minutes considerable heat was generated, the material foamed to a height of about 1¾ inches and cured in place. The time of the entire operation from the initial mixing to the end of the foaming was about 10 minutes. Before the cellular product had cooled appreciably the Cellophane was stripped from the bottom of the piece. The slab was trimmed to a size of 22 in. x 22 in. x 1½ in. It had a density of about 7 to 8 pounds per cubic foot.

Another sample, prepared in a manner similar to that described above, had the following physical properties:

|  | Pounds per square inch |
|---|---|
| Compression strength | 137 |
| Shear strength | 52 |
| Modulus of elasticity | 15,100 |

Example 4

| | Parts |
|---|---|
| Resin A | 2900.0 |
| Approximately 30% aqueous solution of a technical grade of phenol sulfonic acid | 203.0 |
| Sodium bicarbonate | 20.3 |
| Walnut shell flour | 162.4 |
| Tween 20 | 5.8 |

The aqueous solution of phenol sulfonic acid and the Tween 20 were mixed together, the resulting mixture then being stirred into the resin with the aid of an electric mixing device. The sodium bicarbonate and walnut shell flour were now added, while continuing to stir the mixture. The thoroughly mixed mass was poured into a sheet metal container, 3 in. wide x 20 in. long x 12 in. deep, with rounded corners, the inner surfaces of which previously had been lubricated with cup grease. Within about 2 to 3 minutes sufficient heat was generated and gas was evolved to cause the material to rise to a height of 35 inches. The slab of cellular product was removed from the container and trimmed to a size of 3 in. x 20 in. x 29 in. It had a density of about 2 to 3 pounds per cubic foot and a thermal conductivity value for "K" of about 0.24.

In practicing our invention it is essential that the foam-forming composition contain both a water-soluble sulfonic acid and a water-soluble, gasifiable substance that will liberate a gas while in contact with a water-soluble sulfonic acid. When, for example, sodium bicarbonate alone is mixed with the liquid resin in the proportions and under the conditions described in the foregoing examples, there is no foaming or other visible evidence of reaction. On the other hand, when, for instance, an aqueous solution of phenol sulfonic acid alone is mixed with the liquid resin in the proportions and under the conditions described in the examples, a violent reaction takes place and, although some foaming occurs and the resin hardens in expanded state, the product thereby obtained is relatively dense, extremely variable in density and appearance throughout the mass (stratification takes place), shows a non-uniform rise, and is unsuited for commercial use as a cellular material.

The addition of a relatively small amount of a fined divided filler, e. g., walnut shell flour, diatomaceous earth, carbon black, powdered mica, ground phenolic resin foam prepared as herein disclosed and claimed, etc., ordinarily improves the texture of the rigid foam, especially when no surface-active material is employed. The filler is particularly useful in producing cellular slabs (e. g., from 1 to 2 inches thick) of relatively high density, in which case as little as 0.3% filler (by weight of the aqueous resin) has been found to have a marked effect. Lower amounts of filler, e. g., 0.05% or 0.1% by weight of the aqueous resin may be used if desired, but no particular advantage ordinarily accrues from the use of less than about 0.3%. As much as about 10% filler (by weight of the aqueous resin) has been employed, but with amounts much above about 7% the mix usually becomes so viscous that large pockets of gas tend to be entrapped while mixing or pouring the resinous mass, or during its expansion, as a result of which the rigid foam lacks uniformity of texture. Hence the filler, if used at all, generally is employed in an amount corresponding to about 0.3 to about 7%, more particularly about 0.35 to about 6%, by weight of the aqueous resin.

In incorporating the sulfonic acid, e. g., phenol sulfonic acid, with the liquid resin, we prefer to use an aqueous solution containing the acid, more specifically an aqueous solution containing, by weight, approximately 30% of the acid. The acid may be introduced in concentrated state, but the more concentrated forms of the acid have the disadvantage that they are more difficult to control because of the greater reactivity of the acid in concentrated state. Those aqueous resins which may expand only slowly with a 30% concentration of the acid sometimes expand with satisfactory rapidity when the same amount of acid is added in the form of a solution of higher concentration, e. g., 40 or 50% concentration or higher. Thus we have found that with butyl sulfonic acid a 50% aqueous solution gives somewhat better results than the same amount of acid in the form of a 30% aqueous solution. Concentrations below about 30%, e. g., 10 or 20%, have the disadvantage of introducing a larger amount of water than may be desirable into the initial mix, thus decreasing the rate of reaction and tending to produce large gas pockets in the expanded resin.

The amount of sulfonic acid employed may vary widely, the chosen amount depending upon such influencing factors as the following: the size of the batch, the depth of the liquid layer when poured, the activity of the particular liquid resin used, whether a cellular resin of high or low density is desired, the heat loss from the container, etc.; in fact, anything that affects the heat of reaction will be reflected in the amount of acid used. Thus we have used the sulfonic acid in an amount corresponding to, for example, from about 4% to about 15% of a 30% solution of the acid, specifically phenol sulfonic acid. The usual range is about 5 to 10% of a 30% solution or its equivalent in different concentrations. For making a high-density cellular resin where a minimum rise is essential, a range of 5 to 7% of a 30% solution is common. For making the low-density product where maximum expansion is desired, a range of 5 to 10% of a 30% solution generally is used, depending largely upon the size of the batch and the type of rise wanted. In general, above about 10% of the acid solution (30% acid concentration) is employed only when a substantial amount of filler is a component of the mix, since the filler usually retards somewhat the curing of the resin. Percentages above about 15% of a 30% acid solution (or its equivalent in other concentrations) have the same disadvantages mentioned above with reference to the concentration of the sulfonic acid solution. All of the aforementioned percentages of the acid solution are by weight and, as are all the other percentages of the ingredients mentioned herein, are based on the liquid resin unless otherwise stated.

Generally speaking, it may be said that for fastest cure of the expanded resin the amount of sulfonic acid should be at least in excess of the molecular equivalent required for complete reaction with the gasifiable substance employed. Of course, if the liquid phenolic resin is not initially non-alkaline (that is, neutral or slightly acid), it should either be rendered non-alkaline prior to the addition of the sulfonic acid solution or enough additional acid solution should be used to neutralize the alkalinity of the resin. When the amount of sulfonic acid is so adjusted, the resinous material will be at least slightly acid during or immediately after its expansion, and fastest cure of the cellular resin to the C-stage (insoluble and infusible stage) will be obtained.

Illustrative examples of other water-soluble sulfonic acids that may be used, in addition to those hereinbefore mentioned, are:

1-naphthol 5-sulfonic acid
1-naphthol 8-sulfonic acid
2-naphthol 3,6-disulfonic acid
2-naphthol 1-sulfonic acid
2-naphthol 6,8-disulfonic acid
Anthraquinone 2-sulfonic acid
Anthraquinone 2,7-disulfonic acid
Aniline 2,5-disulfonic acid
The water-soluble aliphatic sulfonic acids, e. g., propyl sulfonic acids, butyl sulfonic acids, amyl sulfonic acids, hexyl sulfonic acids, etc.
Cholrobenzene 3,5-disulfonic acid
Bromobenzene 4-sulfonic acid
The ortho-, meta- and para-cresol sulfonic acids
The xylenol sulfonic acids
The ethyl-phenol sulfonic acids
The propyl-phenol sulfonic acids
The butyl-phenol sulfonic acids
The naphthylamine sulfonic acids, e. g., 1-naphthylamine-2-sulfonic acid
1-amino 5-naphthol 7-sulfonic acid
The dihydroxynaphthalene disulfonic acids, e. g., 1,3-dihydroxynaphthalene 5,7-disulfonic acid, 1,5-dihydroxynaphthalene 3,7-disulfonic acid, etc.
1-naphthylamine 3,6,8-trisulfonic acid
The dihydroxy benzene sulfonic acids, e. g., resorcinol sulfonic acids, catechol sulfonic acids, etc.
The water-soluble sulfonic acids derived from petroleum oils and tars
etc.

The amount of water-soluble, gasifiable substance, e. g., sodium bicarbonate, also may be considerably varied. Thus we have used amounts varying, for example, between 0.3 and 1.5% by weight of the liquid resin. Below about 0.3% the rising and refining effect provided by the gasifiable substance is of no appreciable significance. With amounts above about 1%, an excessively large amount of sulfonic acid is required. We prefer to use the sodium bicarbonate or equivalent gasifiable substance in an amount within the range of 0.5 to 0.9% by weight of the liquid resin, optimum results generally being obtained with sodium bicarbonate present in an amount corresponding to about 0.7 to about 0.8% by weight of the liquid resin.

Although various liquid, acid-curing, thermosetting phenolic resins may be employed in practicing our invention, we prefer to use a liquid resin such as described under Example 1 or a resin similarly prepared but using an equivalent amount of 100% synthetic phenol instead of "82% phenol," since with such resins we have obtained best results. Although the resin of that example involved the use of phenol and formaldehyde in the ratio of 1 mol phenol to about 1.3 mols formaldehyde, good results also have been obtained with liquid resins wherein the phenol and formaldehyde were used in the ratio of about 1.1 or 1.2 mols formaldehyde per mol of phenol. When the formaldehyde-phenol molar ratio is much above 1.3 to 1, e. g., 1.6 or more to 1, the expansion of the resin usually is less rapid, the amount of expansion tends to be less, and the texture of the foam is not quite so good as with resins involving the use of lower ratios of formaldehyde to phenol. Although the use of phenol-formaldehyde liquid resins having a formaldehyde-phenol ratio of 2 or more to 1 is not precluded, we prefer for the reasons just indicated to use liquid partial reaction products obtained by effecting reaction between ingredients comprising a phenol, specifically phenol ($C_6H_5OH$) itself, and an aldehyde, more particularly formaldehyde, in the ratio of 1 mol phenol to about 1.0 to 1.5 mols aldehyde. A phenol-formaldehyde liquid resin prepared as described in Alexander Patent No. 2,218,373, issued October 15, 1940, dehydrated to a point where it contains approximately 75 to 85% resin solids, more particularly about 80% resin solids, also is suitable for use. Examples of other acid-curing, thermosetting phenolic resins which may be expanded as herein described to yield cellular masses having valuable properties and uses are the liquid, alkaline-catalyzed products of partial reaction of:

Phenol and furfural,
m-Cresol and formaldehyde,
m-Cresol and furfural,
3,5-xylenol and formaldehyde,
3,5-xylenol and furfural,
Phenol, formaldehyde and furfural,
Phenol, m-cresol and furfural,
Phenol, resorcinol and formaldehyde,
Phenol, resorcinol and furfural,
Phenol, formaldehyde and acetone,
Phenol, formaldehyde and acetaldehyde,
Phenol, phenyl phenol and formaldehyde,
Phenol, alpha-phenylethyl phenol and formaldehyde,
Phenol, m-cresol, formaldehyde and furfural,
"82% phenol" and furfural,
"82% phenol," formaldehyde and furfural.

The amount of surface-active material may be varied, for example, within the range of 0.05% to 0.5% by weight of the liquid resin, in most cases without any appreciable change in its effectiveness. Below about 0.05% the beneficial effect (increased expansion, better texture, etc.) appears to taper off. Tween 20, Tween 60 and Tween 80 give almost identical results, providing highest rise with best texture. All of these compounds, which are surface-active agents comprising polyethylene ethers of sorbitan mono-ester of a fatty acid containing from 12 to 18 carbon atoms, inclusive, are obtainable from the Atlas Powder Company, Tween 60 being a commercial grade of polyethylene ethers of sorbitan mono-stearate and Tween 80 being a commercial grade of polyethylene ethers of sorbitan mono-oleate. The advantage of Tween 20 is that it is very fluid and can be mixed readily with the other components. The oleic acid ester of polyethylene glycol (molecular weight: approximately 600), the stearic acid ester of polyethylene glycol (molecular weight: approximately 4000), the mixed cocoanut fatty acid (lauric and myristic acids) esters of polyethylene glycol (molecular weight: approximately 400) and the oleic acid ester of polyethylene glycol (molecular weight: approximately 1500) also may be used. Of these compounds, the polyethylene glycol (molecular weight: approximately 600) ester of oleic acid is almost as effective as the Tweens. Technical grades of dodecyl dimethyl amine oxide, oleyl dimethyl amine oxide and hexadecyl dimethyl amine oxide sold under the designation Ammonyx AO, OO and CO, respectively, by the Onyx Oil and Chemical Company, New York, N. Y., and the technical grade of alkyl (approximately 16 carbon atoms) dimethyl benzyl ammonium chloride, sold by this same company under the designation Ammonyx T also may be employed. Likewise satisfactory for use are the ethers of isocyclic hydroxyl compounds disclosed and claimed in U. S. Patent No. 2,213,477, issued September 3, 1940.

For optimum results the temperature of the liquid resin before mixing the other components therewith is important. For instance, good results are obtained by mixing the ingredients together when the liquid resin, as well as the other components, are initially at a temperature within the range of about 20° to about 30° C. Somewhat better results are obtained when the temperature is within a narrower range, for instance, when the liquid resin is at a temperature of about 25° to 28° C. before adding the other ingredients, which also are at approximately the same temperature. At the lower temperatures, that is, below about 23° C., the expansion generally is slightly less (other factors being the same) than when the initial temperature of the liquid resin is somewhat higher, due to the fact that too much of the heat of the reaction merely warms the resin without aiding in the foaming and curing action. When the initial temperature of the resin is much above about 30° C., the reaction tends to proceed more rapidly than may be desired and may result in the formation of large gas pockets in the foamed resin.

Although the order in which the ingredients are mixed together may be varied as desired or as conditions may require, a common procedure is to add the sulfonic acid, specifically in solution state, mix, and finally add the gasifiable substance, followed by further mixing. The mixing operation that we employ is not such as to whip any substantial amount of air into the composition and thus cause its expansion, but is merely of such nature as to assure the thorough and complete distribution of the addition agents throughout the liquid resin. In fact, every possible means is taken to prevent the inclusion of air and subsequent inferior foam texture. If a surface-active agent also is employed, it is usually first mixed with the sulfonic acid solution, and this mixture then is mixed with the liquid resin prior to the addition of the gasifiable substance. If a finely divided or comminuted filler is a component of the mix, good results have been obtained by adding it after the gasifiable substance has been mixed in or by adding both the filler and the gasifiable substance at the same time. If desired, the filler and the gasifiable substance may be thoroughly mixed together, as by ball milling for a short period, prior to addition to the liquid resin.

The low-density, cellular phenolic resins of this invention, for example those having a density of the order of about 2 to 3 pounds per cubic foot, are best prepared by causing a long vertical rise through a relatively small cross-section (see Example 4). The high-density cellular resins, for instance those having a density of the order of about 7 to 9 pounds per cubic foot, usually are obtained by omitting the surface-active material from the reaction mix and by causing a small vertical rise over a large area (see Example 3).

The cellular products of this invention have a wide field of utility. They may be used, for instance, in buoyancy applications (e. g., in floats, pontoons, etc.); as a thermal insulating material (e. g., in refrigerators, air-conditioning apparatus, scientific apparatus, oil-refinery equipment used in separating wax from oil at low temperatures, etc.); in acoustical insulating applications; as a construction material (e. g., as the inner core between solid, that is, substantially non-cellular, layers of material, for instance layers of metal foil or sheet material such as aluminum, steel, tin, iron, etc., wood, plywood, laminated paper, laminated cloth, including laminated glass cloth, etc.); as a space filler; and in certain electrically insulating applications.

What we claim as new and desire to secure by Letters Patent of the United States is:

1. The method of preparing a cellular phenolic resin which comprises allowing to expand a foam-forming, heat-generating, acidified, flowable composition containing (1) an aqueous mass of acid-curing, thermosetting, liquid product of partial reacton of ingredients comprising a phenol and an aldehyde, said aqueous mass containing at least about 75 per cent, by weight, of the aforesaid phenol-aldehyde reaction product as solids, (2) a water-soluble salt of carbonic acid in an amount corresponding to from about 0.3 to 1.5 per cent, by weight, of said aqueous mass of (1), and (3) a water-soluble sulfonic acid, the amount thereof being slightly in excess of the molecular equivalent required for complete reaction with the salt of (2).

2. The method of producing a cellular phenolic resin which comprises preparing a foam-forming, heat-generating, acidified, flowable composition by mixing together at an initial temperature within the range of about 20° to about 30° C. ingredients including (1) an aqueous mass of acid-curing, thermosetting, liquid product of partial reaction of ingredients comprising a phenol and an aldehyde, said aqueous mass containing at least about 75 per cent, by weight, of the aforesaid phenol-aldehyde reaction product as solids, (2) a water-soluble salt of carbonic acid in an amount corresponding to from about 0.3 to 1.5 per cent by weight of said aqueous mass of (1), and (3) a water-soluble sulfonic acid wherein the sulfonic acid grouping is attached directly to an aromatic nucleus, the amount of said sulfonic acid being slightly in excess of the molecular equivalent required for complete reaction with the salt of (2), and allowing the said flowable composition to expand.

3. The method of producing a cellular phenolic resin which comprises preparing a foam-forming, heat-generating, acidified, flowable mass by mixing together, at 20° to 30° C. initial temperature, ingredients including (1) a water-containing, acid-curing, thermosetting, liquid product of partial reaction of ingredients comprising a phenol and formaldehyde, said aqueous mass containing at least about 75 per cent, by weight, of the aforesaid phenol-formaldehyde reaction product as solids, (2) a bicarbonate of an alkali metal in an amount corresponding to from about 0.3 to 1.5 per cent by weight of said aqueous mass of (1), and (3) a water-soluble sulfonic acid wherein the sulfonic acid grouping is attached directly to the aromatic nucleus of a hydroxy aromatic compound, the amount of said sulfonic acid being slightly in excess of the molecular equivalent required for complete reaction with the salt of (2), and allowing the said flowable mass to expand.

4. The method of producing a cellular phenol-formaldehyde resin which comprises allowing to expand and to react to completion in expanded state a foam-forming, heat-generating, acidified, flowable composition including (1) an aqueous mass of acid-curing, thermosetting, liquid product of partial reaction of ingredients comprising phenol and formaldehyde, said aqueous mass containing at least about 75 per cent by weight of phenol-formaldehyde resin solids, (2) a bicarbonate of an alkali metal in an amount corresponding to from about 0.3 to 1.5 per cent by weight of said aqueous mass of (1), and (3) a hydroxybenzene sulfonic acid, the amount thereof being slightly in excess of the molecular equivalent required for complete reaction with the bicarbonate of (2).

5. The method of preparing a cellular phenol-formaldehyde resin which comprises allowing to expand and to react to completion in expanded state a foam-forming, heat-generating, acidified, flowable composition including (1) an aqueous mass of acid-curing, thermosetting, alkaline-catalyzed, liquid product of partial reaction of a phenol and formaldehyde, said aqueous mass containing about 78 to about 85 per cent by weight of phenol-formaldehyde resin solids and having been treated to render it non-alkaline, (2) sodium bicarbonate in an amount corresponding to from 0.3 to 1.5 per cent by weight of said aqueous mass of (1), and (3) an aqueous solution comprising phenol sulfonic acid, the amount thereof being slightly in excess of the molecular equivalent required for complete reaction with the sodium bicarbonate of (2).

6. The method of preparing a cellular phenolic resin which comprises effecting partial reaction between phenol and an aqueous solution of formaldehyde while admixed with a small amount of barium hydroxide as a catalyst for the reaction, treating the resulting liquid resin to render it non-alkaline, dehydrating the non-alkaline liquid resin until it has a viscosity of approximately 18,000 to 25,000 centipoises at 25° C. and contains about 78 to about 85 per cent by weight of phenol-formaldehyde resin solids, mixing with the said dehydrated liquid resin while it is at about 23° to 28° C. ingredients including (1) sodium bicarbonate in an amount corresponding to from 0.5 to 0.9 per cent by weight of said liquid resin and (2) phenol sulfonic acid in an aqueous solution containing approximately 30 per cent by weight of said acid, the amount of said sulfonic acid being slightly in excess of the molecular equivalent required for complete reaction with the sodium bicarbonate of (1), and allowing the resulting mixture to expand and to react to completion in expanded state.

7. A product comprising a cellular phenolic resin obtained by the expansion of a foam-forming, heat-generating, acidified, flowable composition containing (1) an aqueous mass of acid-curing, thermosetting, liquid product of partial reaction of ingredients comprising a phenol and an aldehyde, said aqueous mass containing at least about 75 per cent, by weight, of the aforesaid phenol-aldehyde reaction product as solids, (2) a water-soluble salt of carbonic acid in an amount corresponding to from about 0.3 to 1.5 per cent, by weight, of said aqueous mass of (1), and (3) a water-soluble sulfonic acid, the amount thereof being slightly in excess of the molecular equivalent required for complete reaction with the salt of (2).

8. An article of manufacture comprising a cellular phenol-aldehyde resin which is the ultimate product of reaction of a foam-forming, heat-generating, acidified, flowable composition including (1) an aqueous mass of acid-curing, thermosetting, liquid product of partial reaction of ingredients including a phenol and an aldehyde said aqueous mass containing at least about 75 per cent, by weight, of the aforesaid phenol-aldehyde reaction product as solids, (2) a water-soluble salt of carbonic acid in an amount corresponding to from about 0.3 to 1.5 per cent by weight of said aqueous mass of (1), and (3) a water-soluble sulfonic acid wherein the sulfonic acid grouping is attached directly to an aromatic nucleus, the amount of said sulfonic acid being slightly in excess of the molecular equivalent required for complete reaction with the salt of (2).

9. A composition comprising the cellular product of complete reaction of a foam-forming, heat-generating, acidified, flowable composition including (1) an aqueous mass of acid-curing, thermosetting, liquid product of partial reaction of ingredients including a phenol and formaldehyde said aqueous mass containing at least about 75 per cent, by weight, of the aforesaid phenol-formaldehyde reaction product as solids, (2) a bicarbonate of an alkali metal in an amount corresponding to from about 0.3 to 1.5 per cent by weight of said aqueous mass of (1), and (3) a water-soluble sulfonic acid wherein the sulfonic acid grouping is attached directly to the aromatic nucleus of a hydroxy aromatic compound, the amount of said sulfonic acid being slightly in excess of the molecular equivalent required for complete reaction with the salt of (2)

10. A thermal insulating material comprising the cellular product of complete reaction of a foam-forming, heat-generating, acidified, flowable composition including (1) an aqueous mass of acid-curing, thermosetting, liquid product of partial reaction of ingredients comprising phenol and formaldehyde, said aqueous mass containing at least about 75 per cent by weight of phenol-formaldehyde resin solids, (2) a bicarbonate of an alkali metal in an amount corresponding to from about 0.3 to 1.5 per cent by weight of said aqueous mass of (1), and (3) a hydroxybenzene sulfonic acid, the amount thereof being slightly in excess of the molecular equivalent required for complete reaction with the bicarbonate of (2), said cellular product having a density within the range of about ½ to about 17 pounds per cubic foot.

11. A cellular, thermal insulating material which is the ultimate product of reaction of a foam-forming, heat-generating, flowable composition including (1) an aqueous mass of acid-curing, thermosetting, alkaline-catalyzed, liquid product of partial reaction of a phenol and formaldehyde, said aqueous mass containing about 78 to about 85 per cent by weight of phenol formaldehyde resin solids and having been treated to render it non-alkaline, (2) sodium bicarbonate in an amount corresponding to from 0.3 to 1.5 per cent by weight of said aqueous mass of (1), and (3) an aqueous solution comprising phenol sulfonic acid, the amount thereof being slightly in excess of the molecular equivalent required for complete reaction with the sodium bicarbonate of (1).

12. A product comprising the cellular material obtained by the expansion of a foam-forming, heat-generating, acidified, flowable composition containing (1) an aqueous mass of acid-curing, thermosetting, liquid product of partial reaction of ingredients comprising a phenol and an aldehyde, said aqueous mass containing at least about 75 per cent, by weight, of the aforesaid phenol-aldehyde reaction product as solids, (2) a water-soluble salt of carbonic acid in an amount corresponding to from about 0.3 to 1.5 per cent, by weight, of said aqueous mass of (1), (3) a water-soluble sulfonic acid, the amount thereof being slightly in excess of the molecular equivalent required for complete reaction with the salt of (2), and (4) a water-soluble surface-active agent comprising a polyethylene ether of sorbitan mono ester of a long-chain fatty acid, said cellular material having a density less than that of the product obtained by the expansion of a foam-forming composition free from the surface-active agent of (4) but which otherwise is the same.

13. A composition comprising the cellular product obtained by the expansion of a foam-forming, heat-generating, acidified, flowable composition containing (1) an aqueous mass of acid-curing, thermosetting, liquid product of partial reaction of ingredients including a phenol and formaldehyde said aqueous mass containing at least about 75 per cent, by weight, of the aforesaid phenol-formaldehyde reaction product as solids, (2) a water-soluble salt of carbonic acid in an amount corresponding to from about 0.3 to 1.5 per cent by weight of said aqueous mass of (1), (3) a water-soluble sulfonic acid wherein the sulfonic acid grouping is attached directly to an aromatic nucleus, the amount of said sulfonic acid being slightly in excess of the molecular equivalent required for complete reaction with the salt of (2), and (4) a finely divided filler.

14. The cellular phenolic resin which is the product of the method of claim 6.

15. A product as in claim 12 wherein the surface-active agent of (4) comprises polyethylene ethers of sorbitan mono-ester of a fatty acid containing from 12 to 18 carbon atoms, inclusive.

16. A product comprising a cellular phenolic resin obtained by the expansion of a foam-forming, heat-generating, flowable composition including (1) an aqueous mass of acid-curing, thermosetting, barium hydroxide-catalyzed, liquid product of partial reaction of ingredients comprising phenol and formaldehyde, said aqueous mass contaning about 75 to about 85 per cent of phenol-formaldehyde resn solids and having been treated to render it non-alkaline, (2) a water-soluble salt of carbonic acid in an amount corresponding to from 0.3 to 1.5 per cent by weight of said aqueous mass of (1), and (3) an aqueous solution comprising a water-soluble sulfonic acid, the amount thereof being slightly in excess of the molecular equivalent required for complete reaction with the water-soluble salt of (2).

JOHN D. NELSON.
PAUL V. STEENSTRUP.

REFERENCES CITED

The following references are of record in the file of this patent:

UNITED STATES PATENTS

| Number | Name | Date |
|---|---|---|
| 2,158,033 | McKinney | May 9, 1939 |
| 2,223,394 | Thompson | Dec. 3, 1940 |
| 2,323,831 | Menger et al. | July 6, 1943 |

---

Certificate of Correction

Patent No. 2,446,429.      August 3, 1948.

JOHN D. NELSON ET AL.

It is hereby certified that errors appear in the printed specification of the above numbered patent requiring correction as follows:

Column 2, line 11, for "object" read *objects*; column 6, line 42, for the word "form" read *from*; column 7, line 49, for "fined" read *finely*; column 9, line 15, for "Cholrobenzene" read *Chlorobenzene*; column 16, line 13, for "resn" read *resin*;

and that the said Letters Patent should be read with these corrections therein that the same may conform to the record of the case in the Patent Office.

Signed and sealed this 22nd day of February, A. D. 1949.

[SEAL]

THOMAS F. MURPHY,
*Assistant Commissioner of Patents.* amount corresponding to from about 0.3 to 1.5 per cent, by weight, of said aqueous mass of (1), (3) a water-soluble sulfonic acid, the amount thereof being slightly in excess of the molecular equivalent required for complete reaction with the salt of (2), and (4) a water-soluble surface-active agent comprising a polyethylene ether of sorbitan mono ester of a long-chain fatty acid, said cellular material having a density less than that of the product obtained by the expansion of a foam-forming composition free from the surface-active agent of (4) but which otherwise is the same.

13. A composition comprising the cellular product obtained by the expansion of a foam-forming, heat-generating, acidified, flowable composition containing (1) an aqueous mass of acid-curing, thermosetting, liquid product of partial reaction of ingredients including a phenol and formaldehyde said aqueous mass containing at least about 75 per cent, by weight, of the aforesaid phenol-formaldehyde reaction product as solids, (2) a water-soluble salt of carbonic acid in an amount corresponding to from about 0.3 to 1.5 per cent by weight of said aqueous mass of (1), (3) a water-soluble sulfonic acid wherein the sulfonic acid grouping is attached directly to an aromatic nucleus, the amount of said sulfonic acid being slightly in excess of the molecular equivalent required for complete reaction with the salt of (2), and (4) a finely divided filler.

14. The cellular phenolic resin which is the product of the method of claim 6.

15. A product as in claim 12 wherein the surface-active agent of (4) comprises polyethylene ethers of sorbitan mono-ester of a fatty acid containing from 12 to 18 carbon atoms, inclusive.

16. A product comprising a cellular phenolic resin obtained by the expansion of a foam-forming, heat-generating, flowable composition including (1) an aqueous mass of acid-curing, thermosetting, barium hydroxide-catalyzed, liquid product of partial reaction of ingredients comprising phenol and formaldehyde, said aqueous mass contaning about 75 to about 85 per cent of phenol-formaldehyde resn solids and having been treated to render it non-alkaline, (2) a water-soluble salt of carbonic acid in an amount corresponding to from 0.3 to 1.5 per cent by weight of said aqueous mass of (1), and (3) an aqueous solution comprising a water-soluble sulfonic acid, the amount thereof being slightly in excess of the molecular equivalent required for complete reaction with the water-soluble salt of (2).

JOHN D. NELSON.
PAUL V. STEENSTRUP.

REFERENCES CITED

The following references are of record in the file of this patent:

UNITED STATES PATENTS

| Number | Name | Date |
|---|---|---|
| 2,158,033 | McKinney | May 9, 1939 |
| 2,223,394 | Thompson | Dec. 3, 1940 |
| 2,323,831 | Menger et al. | July 6, 1943 |

---

Certificate of Correction

Patent No. 2,446,429.            August 3, 1948.

JOHN D. NELSON ET AL.

It is hereby certified that errors appear in the printed specification of the above numbered patent requiring correction as follows:

Column 2, line 11, for "object" read *objects*; column 6, line 42, for the word "form" read *from*; column 7, line 49, for "fined" read *finely*; column 9, line 15, for "Cholrobenzene" read *Chlorobenzene*; column 16, line 13, for "resn" read *resin*;

and that the said Letters Patent should be read with these corrections therein that the same may conform to the record of the case in the Patent Office.

Signed and sealed this 22nd day of February, A. D. 1949.

[SEAL]

THOMAS F. MURPHY,
*Assistant Commissioner of Patents.*